United States Patent
Eyer

(10) Patent No.: US 8,898,720 B2
(45) Date of Patent: Nov. 25, 2014

(54) PARAMETERIZED SERVICES DESCRIPTOR FOR ADVANCED TELEVISION SERVICES

(71) Applicant: Sony Corporation, Tokyo (JP)

(72) Inventor: Mark Eyer, Woodinville, WA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/934,581

(22) Filed: Jul. 3, 2013

(65) Prior Publication Data

US 2014/0020042 A1 Jan. 16, 2014

Related U.S. Application Data

(60) Provisional application No. 61/671,020, filed on Jul. 12, 2012.

(51) Int. Cl.
*H04N 7/173* (2011.01)
*H04N 21/81* (2011.01)
*H04N 21/45* (2011.01)
*H04N 21/482* (2011.01)
*H04N 21/434* (2011.01)

(52) U.S. Cl.
CPC ......... *H04N 21/4516* (2013.01); *H04N 21/816* (2013.01); *H04N 21/4823* (2013.01); *H04N 21/4345* (2013.01)
USPC .......................................... 725/131; 725/114

(58) Field of Classification Search
CPC .. H04N 21/80; H04N 21/816; H04N 21/8166
USPC ........................................... 725/91, 114, 138
See application file for complete search history.

(56) References Cited

U.S. PATENT DOCUMENTS

| | | |
|---|---|---|
| 2006/0095952 A1 | 5/2006 | Chung |
| 2008/0235723 A1 | 9/2008 | Park et al. |
| 2010/0075591 A1 | 3/2010 | Eyer et al. |
| 2010/0162089 A1 | 6/2010 | Yeh et al. |
| 2011/0075990 A1 | 3/2011 | Eyer |
| 2011/0088075 A1 | 4/2011 | Eyer |
| 2011/0234755 A1 | 9/2011 | Suh et al. |
| 2011/0243536 A1 | 10/2011 | Eyer |
| 2011/0246488 A1 | 10/2011 | Eyer |
| 2011/0247028 A1 | 10/2011 | Eyer |
| 2011/0298981 A1 | 12/2011 | Eyer |
| 2011/0299827 A1 | 12/2011 | Eyer |
| 2011/0302599 A1 | 12/2011 | Eyer |
| 2011/0302611 A1 | 12/2011 | Eyer |

(Continued)

OTHER PUBLICATIONS

ATSC Standard: ATSC Parameterized Services Standard Document A/71, Mar. 26, 2007, pp. 2-11.*

(Continued)

*Primary Examiner* — John Schnurr
(74) *Attorney, Agent, or Firm* — Oblon, Spivak, McClelland, Maier & Neustadt, L.L.P.

(57) ABSTRACT

A method, computer program, reception apparatus, and information providing apparatus for accessing or providing access to content. The method includes receiving a transport stream from a content provider. A virtual channel table (VCT) is extracted from the transport stream. Further, a determination is made as to whether one or more services, corresponding to an entry included in the VCT, are supported by the reception apparatus based on one or more parameterized service descriptor (PSD) instances, which are associated with a predetermined Service Type and included in the VCT.

12 Claims, 12 Drawing Sheets

| Syntax | No. of Bits | Mnemonic |
|---|---|---|
| parameterized_service_descriptor() { | | |
| descriptor_tag | 8 | uimsbf |
| descriptor_length | 8 | uimsbf |
| application_tag | 8 | bslbf |
| application_data() | var | |
| } | | |

(56) References Cited

U.S. PATENT DOCUMENTS

| | | |
|---|---|---|
| 2011/0307920 A1 | 12/2011 | Blanchard et al. |
| 2012/0044418 A1 | 2/2012 | Eyer |
| 2012/0047531 A1 | 2/2012 | Eyer |
| 2012/0050619 A1 | 3/2012 | Kitazato et al. |
| 2012/0050620 A1 | 3/2012 | Kitazato |
| 2012/0054214 A1 | 3/2012 | Yamagishi et al. |
| 2012/0054235 A1 | 3/2012 | Kitazato et al. |
| 2012/0054267 A1 | 3/2012 | Yamagishi et al. |
| 2012/0054268 A1 | 3/2012 | Yamagishi |
| 2012/0054783 A1 | 3/2012 | Yamagishi |
| 2012/0054784 A1 | 3/2012 | Kitazato et al. |
| 2012/0054816 A1 | 3/2012 | Dewa |
| 2012/0060197 A1 | 3/2012 | Kitahara et al. |
| 2012/0063508 A1 | 3/2012 | Hattori et al. |
| 2012/0072965 A1 | 3/2012 | Dewa |
| 2012/0081508 A1 | 4/2012 | Kitazato |
| 2012/0081607 A1 | 4/2012 | Kitazato |
| 2012/0082266 A1 | 4/2012 | Kitazato et al. |
| 2012/0082440 A1 | 4/2012 | Kitazato |
| 2012/0084802 A1 | 4/2012 | Kitazato |
| 2012/0084824 A1 | 4/2012 | Kitazato |
| 2012/0084829 A1 | 4/2012 | Kitazato |
| 2012/0185888 A1 | 7/2012 | Eyer et al. |
| 2012/0253826 A1 | 10/2012 | Kitazato et al. |
| 2012/0274848 A1 | 11/2012 | Kitahara et al. |
| 2012/0275764 A1 | 11/2012 | Eyer |
| 2012/0320168 A1* | 12/2012 | Yun et al. .................. 348/51 |
| 2013/0024894 A1 | 1/2013 | Eyer |
| 2013/0024897 A1 | 1/2013 | Eyer |
| 2013/0031569 A1 | 1/2013 | Kitazato et al. |
| 2013/0036440 A1 | 2/2013 | Eyer |
| 2013/0055313 A1 | 2/2013 | Eyer |
| 2013/0103716 A1 | 4/2013 | Yamagishi |
| 2013/0145414 A1 | 6/2013 | Yamagishi |

OTHER PUBLICATIONS

U.S. Appl. No. 13/559,188, filed Jul. 26, 2012, Kitazato.
U.S. Appl. No. 13/587,975, filed Aug. 17, 2012, Kitazato.
U.S. Appl. No. 13/593,554, filed Aug. 24, 2012, Kitazato et al.
U.S. Appl. No. 13/708,313, filed Dec. 7, 2012, Kitazato et al.
U.S. Appl. No. 13/741,863, filed Jan. 15, 2013, Kitazato et al.
U.S. Appl. No. 13/753,591, filed Jan. 30, 2013, Kitazato et al.
U.S. Appl. No. 13/777,429, filed Feb. 26, 2013, Kitazato et al.
U.S. Appl. No. 13/777,693, filed Feb. 26, 2013, Kitazato et al.
U.S. Appl. No. 13/777,734, filed Feb. 26, 2013, Kitazato et al.
U.S. Appl. No. 13/782,694, filed Mar. 1, 2013, Eyer.
U.S. Appl. No. 13/782,730, filed Mar. 1, 2013, Eyer.
U.S. Appl. No. 13/800,818, filed Mar. 13, 2013, Eyer.
U.S. Appl. No. 13/800,734, filed Mar. 13, 2013, Eyer.
U.S. Appl. No. 13/841,343, filed Mar. 15, 2013, Eyer.
U.S. Appl. No. 13/846,282, filed Mar. 18, 2013, Dewa et al.
U.S. Appl. No. 13/846,247, filed Mar. 18, 2013, Kitazato et al.
U.S. Appl. No. 13/888,865, filed May 7, 2013, Kitahara et al.
U.S. Appl. No. 13/894,779, filed May 15, 2013, Yamagishi.
U.S. Appl. No. 13/905,721, filed May 30, 2013, Kitahara et al.
U.S. Appl. No. 13/915,664, filed Jun. 12, 2013, Eyer.
U.S. Appl. No. 13/930,814, filed Jun. 28, 2013, Fay.
U.S. Appl. No. 13/930,880, filed Jun. 28, 2013, Fay et al.
U.S. Appl. No. 13/924,907, filed Jun. 24, 2013, Eyer.
U.S. Appl. No. 13/927,667, filed Jun. 26, 2013, Yamagishi.
International Search Report and Written Opinion issued Aug. 30, 2013 in PCT/US13/45878 filed Jun. 14, 2013 (with Search History).
"ATSC Standard: A/71:2012 Parameterized Services Standard", Advanced Television Systems Committee, http://www.atsc.org/cms/standards/A_71-2012a-Parameterized-Seriveces-Standard.pdf, Dec. 3, 2012, pp. 1-15.

* cited by examiner

| TVCT | | | | | | |
|---|---|---|---|---|---|---|
| num_channels_in_section = 3; TSID = 0x0AA1 | | | | | | |
| Major No. | Minor No. | Short Name | Carrier frequency | Channel TSID | Service Type | Descriptors |
| 8 | 1 | XYZ-A | 620.31 | 0x0AA1 | Digital | channel name; service location |
| 8 | 3 | XYZ-C | 620.31 | 0x0AA1 | Parameterized Service | channel name; service location; component list descriptor |
| 8 | 4 | XYZ-D | 620.31 | 0x0AA1 | Extended Parameterized Service | channel name; service location; component list descriptor (optional); parameterized service descriptor |

FIG. 5A

```
TVCT

...
major_channel_number = 0x003
minor_channel_number = 0x002
...
program_number = 0x0002
...
service_type = 0x09 (Extended Parameterized Service)
...
component_list_descriptor()
parameterized_service_descriptor()
```

FIG. 5B

| Syntax | No. of Bits | Mnemonic |
|---|---|---|
| component_list_descriptor() { | | |
| descriptor_tag | 8 | uimsbf |
| descriptor_length | 8 | uimsbf |
| alternate | 1 | bslbf |
| component_count | 7 | uimsbf |
| for (i=0; I < component_count; i++) { | | |
|   stream_type | 8 | uimsbf |
|   format_identifier | 32 | uimsbf |
|   length_of_details | 8 | uimsbf |
|   stream_info_details() | var | |
| } | | |
| } | | |

FIG. 6

| Syntax | No. of Bits | Mnemonic |
|---|---|---|
| Stream_info_details() { | | |
|   profile | 2 | uimsbf |
|   level | 3 | uimsbf |
|   reserved | 3 | '111' |
| } | | |

FIG. 7

| Syntax | No. of Bits | Mnemonic |
|---|---|---|
| parameterized_service_descriptor() { | | |
| descriptor_tag | 8 | uimsbf |
| descriptor_length | 8 | uimsbf |
| application_tag | 8 | bslbf |
| application_data() | var | |
| } | | |

FIG. 8

| Syntax | No. of bits | Format |
|---|---|---|
| stream_info_details() { | | |
|    additional_view_AVC_profile | 2 | uimsbf |
|    additional_view_level_idc | 6 | uimsbf |
|    horizontal_upsampling_factor | 4 | uimsbf |
|    vertical_upsampling_factor | 4 | uimsbf |
| } | | |

FIG. 10A

| Value | Description |
|---|---|
| '0000' | Forbidden |
| '0001' | unspecified |
| '0010' | Coded resolution is same as coded resolution of base view |
| '0011' | Coded resolution is ¾ coded resolution of base view |
| '0100' | Coded resolution is ⅔ coded resolution of base view |
| '0101' | Coded resolution is ½ coded resolution of base view |
| '0110'-'1000' | reserved |
| '1001'-'1111' | user private |

FIG. 10B

| Syntax | No. of bits | Format |
|---|---|---|
| application_data(0x01) { | | |
|   reserved | 3 | uimsbf |
|   3D_channel_type | 5 | uimsbf |
|   for (i=0; i<N; i++) { | | |
|     reserved | 8 | bslbf |
|   } | | |
| } | | |

FIG. 11A

| 3D_channel_type | Description |
|---|---|
| 0x00 | Frame compatible stereoscopic 3D service – side-by-side |
| 0x01 | Frame compatible stereoscopic 3D service – top and bottom |
| 0x02 | Full-frame stereoscopic 3D service – single stream |
| 0x03 | Full-frame stereoscopic 3D service – base and additional view streams; additional view in-band |
| 0x04-0x1F | ATSC Reserved |

FIG. 11B

| 3D_channel_type | Description |
|---|---|
| 0x00 | Frame compatible stereoscopic 3D service – side-by-side |
| 0x01 | Frame compatible stereoscopic 3D service – top and bottom |
| 0x02 | Full-frame stereoscopic 3D service – single stream |
| 0x03 | Full-frame stereoscopic 3D service – base and additional view streams; additional view in-band |
| Possible future expansion | |
| 0x04 | Full-frame stereoscopic 3D service – base and additional view streams; additional view via NRT |
| 0x05 | Full-frame stereoscopic 3D service – base and additional view streams; additional view via broadband |
| 0x06 | Full-frame stereoscopic 3D service – base and additional view streams; additional view via ATSC Mobile |
| 0x06-0x1F | ATSC Reserved |

FIG. 11C

| 3D Format | Component List Descriptor Contents |
|---|---|
| 0x00. FC3D – SbS | stream_type and stream_info_details() (e.g. 0x1B + stream_info_details() from A/72) |
| 0x01. FC3D – TnB | stream_type and stream_info_details() (e.g. 0x1B + stream_info_details() from A/72) |
| 0x02. FF3D – 1S | stream_type and stream_info_details() |
| 0x03. FF3D – 2S 1B | stream_type and stream_info_details() for base view and stream_type and stream_info_details() for additional view |

FIG. 13A

| Syntax | No. of bits | Format |
|---|---|---|
| stereoscopic_3D_channel_info_descriptor() { | | |
| descriptor_tag | 8 | uimsbf TBD |
| descriptor_length | 8 | uimsbf |
| reserved | 3 | uimsbf |
| 3D_channel_type | 5 | uimsbf |
| for (i=0; i<descriptor_length-1; i++) { | | |
| reserved | 8 | bslbf |
| } | | |
| } | | |

FIG. 13B

PARAMETERIZED SERVICES DESCRIPTOR FOR ADVANCED TELEVISION SERVICES

CROSS REFERENCE TO RELATED APPLICATION

This application is related and claims priority to U.S. provisional patent application No. 61/671,020, filed Jul. 12, 2012, which is incorporated herein by reference in its entirety.

BACKGROUND OF THE INVENTION

1. Field of the Invention

Embodiments described herein relate generally to a method, computer program, reception apparatus, and information providing apparatus for signaling in a television broadcast.

2. Background

Modern televisions allow users to view content of various service types. For example, a content provider may provide regular digital television services and/or audio-only services. As the number of service types increases, there exists a need to provide signaling to allow a receiver to determine whether it can support new services while maintaining backwards compatibility.

SUMMARY OF THE INVENTION

The present embodiments are directed to allowing a receiver to determine whether it can support one or more received services while maintaining backwards compatibility.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 5A and 5B illustrate exemplary Virtual Channel Tables;

FIG. 6 illustrates an exemplary bit stream syntax of a component_list_descriptor( );

FIG. 7 illustrates an exemplary stream_information_details( ) syntax for a stream_type;

FIG. 8 illustrates an exemplary bit stream syntax for a parameterized_service_descriptor( );

FIG. 10A illustrates an exemplary stream_info_details( ) syntax;

FIG. 10B illustrates exemplary horizontal and vertical up-sampling factors;

FIG. 11A illustrates exemplary application_data( ) included in the parameterized_service_descriptor( );

FIG. 11B illustrates exemplary coding for a 3D_channel_type;

FIG. 11C illustrates another example of coding for a 3D_channel_type;

FIG. 13A illustrates an exemplary component list descriptor.

FIG. 13B illustrates an exemplary stereoscopic channel info descriptor.

DETAILED DESCRIPTION

Figure 1:
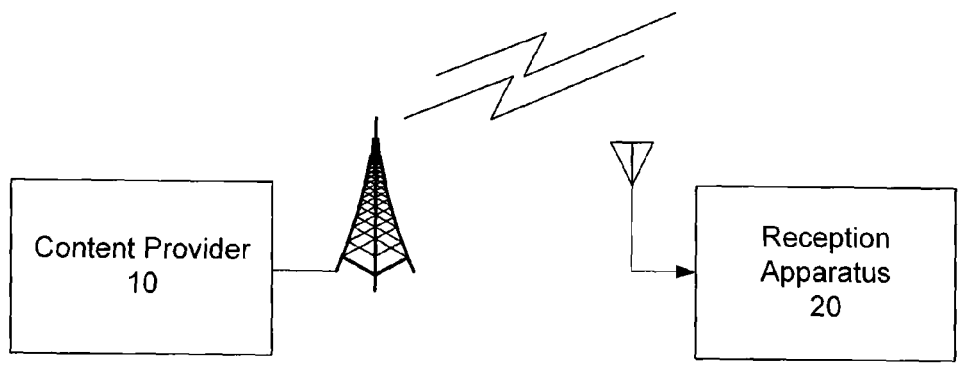
FIG. 1 is a block diagram that shows an exemplary broadcast system.

According to an embodiment of the disclosure, there is provided a method of a reception apparatus for accessing content. The method includes receiving a transport stream from a content provider. A virtual channel table (VCT) is extracted from the transport stream. Further, a determination is made as to whether one or more services, corresponding to an entry included in the VCT, are supported by the reception apparatus based on one or more parameterized service descriptor (PSD) instances, which are associated with a predetermined Service Type and included in the VCT.

According to another embodiment of the method, the PSD includes a descriptor tag, a descriptor length, an application tag, and application data.

According to another embodiment of the method, the PSD is associated with Service Type 0x09.

According to another embodiment of the method, the step of determining includes parsing a component list descriptor including one or more stream types and determining whether the one or more stream types are supported by the reception apparatus. The component list descriptor is included in the VCT.

According to another embodiment of the method, the step of determining includes determining whether the application tag included in the PSD is recognized, whether the length of the PSD is within a predetermined range, and whether each mode defined in the application data is supported by the reception apparatus. The reception apparatus determines whether the one of more services, corresponding to the entry included in the VCT, are supported by the reception apparatus when the application tag is recognized, the length of the PSD is within the predetermined range, and each mode defined in the application data is supported.

Further, according to an embodiment of the disclosure, there is provided a computer-readable storage medium having instructions embedded therein, which, when executed by a computer, cause the computer to perform the method of the reception apparatus, as discussed above.

According to an embodiment of the disclosure, there is provided a reception apparatus. The reception apparatus includes a receiving unit, an extracting unit, and a processor. The receiving unit is configured to receive a transport stream from a content provider. The extracting unit is configured to extract a VCT from the transport stream. Further, the processor is configured to determine whether one or more services, corresponding to an entry included in the VCT, are supported by the reception apparatus based on one or more PSD instances, which are associated with a predetermined Service Type and included in the VCT.

According to another embodiment of the reception apparatus, the PSD includes a descriptor tag, a descriptor length, an application tag, and application data.

According to another embodiment of the reception apparatus, the PSD is associated with Service Type 0x09.

According to another embodiment of the reception apparatus, the processor is further configured to parse at least one component list descriptor including one or more stream types and determine whether the one or more stream types are supported by the reception apparatus. The component list descriptor is included in the VCT.

According to another embodiment of the reception apparatus, the processor is further configured to determine whether the application tag included in the PSD is recognized, whether the length of the PSD is within a predetermined range, and whether each mode defined in the application data is supported by the reception apparatus. The processor determines whether the one of more services, corresponding to the entry included in the VCT, are supported by the reception apparatus when the application tag is recognized, the length of the PSD is within the predetermined range, and each mode defined in the application data is supported.

Further, according to an embodiment of the disclosure, there is provided an information providing apparatus. The information providing apparatus includes a content supplying unit, an encoder, and a multiplexer. The content supplying unit is configured to store or receive content. The encoder is configured to encode the content. The multiplexer is configured to generate a transport stream including the encoded content and a VCT. The VCT includes one or more PSD instances associated with a predetermined Service Type.

While this disclosure is susceptible of embodiment in many different forms, there is shown in the drawings and will herein be described in detail specific embodiments, with the understanding that the present disclosure of such embodiments is to be considered as an example of the principles and not intended to limit the disclosure to the specific embodiments shown and described. In the description below, like reference numerals are used to describe the same, similar or corresponding parts in the several views of the drawings.

Certain embodiments described herein relate generally to signaling in a television broadcast that allows the reception apparatus to determine whether or not it has the necessary hardware and/or software resources to be able to provide a meaningful presentation of one or more services on a given channel.

In the Advanced Television Systems Committee (ATSC) standards (specifically, A/53 and A/65, which are incorporated herein by reference in their entirety), new types of services can be specified by defining new values of a parameter called "Service Type." Each defined Virtual Channel (see A/65) is associated with a Service Type value. For example, a regular Digital Television (DTV) service is Service Type 0x02. Note: the "0x" prefix denotes hexadecimal notation. An audio-only virtual channel can be broadcast using Service Type 0x03.

Receivers encountering a Virtual Channel with a Service Type value that is either known to be unsupported, or which is unrecognized, are expected to disregard the channel (i.e., not offer it to the user for selection or viewing).

ATSC Standard A/71, which is incorporated herein by reference in its entirety, defines a generalized method that allows the broadcaster to create a new broadcast service using new codecs. A/71 defines a new Service Type value 0x07 (called "Parameterized Service"). The signaling required for broadcast of a Parameterized Service is a descriptor identifying the types of streams that must be decoded for the receiver to be able to offer the service to the viewer. Codecs and values of stream_type are defined by the Moving Picture Experts Group (MPEG) or other standards bodies. For example, since the time of the original ATSC DTV standard, Advanced Video Codec (AVC) has been standardized by MPEG and assigned stream_type value 0x1B.

In addition to listing the stream types the service will involve, a data structure is defined for each stream type to provide further information the receiver may need to determine if it has the resources necessary to decode the stream. This information is carried in a generalized data structure called stream_info_details( ). The syntax and semantics for stream_info_details( ) varies according to which stream_type is being defined. ATSC has standardized a stream_info_details( ) for AVC in ATSC Standard A/72, which is incorporated herein by reference in its entirety.

Typically, the stream_info_details( ) signals parameters convey the level of difficulty in decoding the stream. For the codecs developed by MPEG (MPEG-2 video and AVC, for example), these parameters are typically embodied in what are known as "profiles and levels."

The concept embodied in the original A/71 standard was that Service Type 0x07 could be used when a broadcaster wished to offer a linear TV service using codecs other than the normal MPEG-2 video and AC-3 audio. So, a service using AVC for video and AC-3 for audio could be signaled by use of Service Type 0x07, using the stream_info_details( ) for AVC defined in ATSC Standard A/72. A receiver designed to support a new codec and to understand ATSC stream_info_details( ) sees a VCT entry with service_type=0x07, checks stream_type values and stream_info_details( ) to determine (yes/no) whether it is capable of decoding the channel. If capable, the receiver simply decodes the audio and/or video associated with the VCT entry.

Recently, shortcomings in the original ATSC Standard A/71 were recognized. Specifically, some new services (e.g., 3D-TV) sometimes involve more than a simple identification of required codecs. These new services require more complex descriptions of what is needed in the receiver to render the service. An example of a case where A/71 fails to provide the necessary level of signaling is frame-compatible 3D. In frame-compatible 3D, one 1920×1080 coded video frame carries two images, one for the left eye and one for the right eye. The frame can be split either horizontally (known as top-and-bottom, "TnB") or vertically (known as side-by-side, "SbS"). If A/71 is used for such a service, a receiver would know about the AVC stream, for example when stream_type=0x1B (AVC), and could conclude that the channel can be properly decoded, even if the receiver cannot support frame-compatible decoding. However, the receiver would not know that the coding was SbS or TnB frame-compatible 3D.

In another example, an additional view may be delivered by other means, for example ATSC M/H (a standard for mobile digital TV, which allows broadcasts to be received by mobile devices), non-real-time delivery, or the Internet. In the case of A/71, the stream_info_details( ) cannot convey the transport method of the stream, or information such as "high speed internet connection required."

In some 3D use cases, the A/71 method can be utilized. For example, if stream_type is an "additional view" codec, the CLD can include stream_info_details( ) for both base and alternative views. The stream_info_details( ) for the alternate view could also indicate requirements for combining the views (e.g., upsampling, scaling).

In response to this recognized shortcoming, embodiments of the present disclosure use a new Service Type, known as Extended Parameterized Service (EPS), for signaling. The descriptor that describes the streams and the stream_info_details( ) may optionally be used with an EPS. In one embodiment, Service Type 0x09 is used to identify an EPS. However, other unassigned Service Type numbers may be used to identify the EPS. Further, in other embodiments, a plurality of unassigned Service Type numbers are used.

In certain embodiments, the EPS provides VCT-level signaling for 3D-TV. The EPS allows for all information a 3D-capable receiver needs to determine whether or not it can decode the channel. For example, using the EPS, the 3D-capable receiver determines whether it is signal service-compatible, frame compatible, or compatible with further modes (e.g., hybrid modes).

One approach for the EPS is to require the presence of one or more descriptors in the virtual channel definition of a channel of Service Type 0x09, where the descriptors define receiver requirements for proper decoding of the channel. The expected receiver behavior when processing a channel of Service Type 0x09 would be to look at each descriptor and decide whether (1) the tag value (identity) of the descriptor is recognized and, if so, (2) whether the receiver can support the modes of operation for the service identified in the descriptor.

In place of the rule that the receiver is to process each different descriptor, embodiments of the present disclosure define one new type of descriptor called a Parameterized Service Descriptor (PSD), which carries information pertinent to a particular standardized application. Within the PSD is an application identifier that establishes the syntax and semantics of the remainder of the descriptor. The expected behavior of the receiver is thus to process each PSD, determine if the application identifier is known and supported, and if so, parse the additional data to see if the modes of operation are also supported.

The advantages of the PSD as compared with the approach noted above include:

1. The general rule for receivers in the ATSC standards to disregard unrecognized descriptors is maintained. Requiring receivers which understand Service Type 0x09 to also recognize the PSD means that this general rule is maintained. For example, other descriptors may appear in the VCT entry for Service Type 0x09, but they can be (and are expected to be) safely disregarded by receivers built before they were specified in the standards.

2. The data specified for each application will be specified with the express purpose of signaling to the receiver information necessary to determine whether or not the given service is supported. The possible re-application of some other descriptor for use with Service Type 0x09 is avoided.

3. If a new descriptor type must be specified for each new application, the number of defined descriptors would grow unnecessarily quickly. There is a limit to the number space available for new descriptor tag values. Further, values of application_tag, which is the field used to identify the application associated with the virtual channel, can be managed by the ATSC Code Point Registrar.

Referring now to the drawings, FIG. 1 is a block diagram that shows an exemplary broadcast system 2, including a content provider 10 and a reception apparatus 20. In one embodiment, the content provider 10 includes a transmission apparatus with a transmitter that is configured to transmit one or more content to the reception apparatus 20. Each content is associated with a Virtual Channel defined in a Virtual Channel Table (VCT), and is received by the reception apparatus 20 via a tuner interface. In certain embodiments, the VCT is static over time and does not change on an event-by-event basis. Further, the VCT indicates the "most-difficult" situation (e.g., 3D even if some portions of programming are 2D).

In one embodiment, the reception apparatus 20 is configured to receive content from the content provider 10 via a terrestrial broadcast. When receiving content via a terrestrial broadcast, the reception apparatus 20 uses a Terrestrial Virtual Channel Table (TVCT) to tune to the content provided by the content provider 10. In other embodiments, the content provider 10 provides the content via at least one of a satellite broadcast, a cable television transmission, a terrestrial television broadcast, cellular network, and data communication network such as a local area network (LAN), wide area network (WAN), or the Internet. When the reception apparatus 20 receives the content via a cable television transmission, the reception apparatus 20 uses a Cable Virtual Channel Table (CVCT) to tune to the content provided by the content provider 10. Examples of the TVCT and CVCT are described in ATSC Standard A/65.

In telecommunications, a virtual channel is a channel designation which may differ from the actual channel or frequency on which a signal travels over a transport stream. The term is often applied in the television environment, where several Digital Television (DTV) channels may be present within a single 6 MHz physical channel. For example, a station branded as Channel 8 might actually use RF channel 32 for its transmitted signal, but a VCT allows viewers to "tune in" the station on channel 8 on a digital television. The virtual channel entry in the VCT thus enables viewers to select the station by choosing the same channel number as they would have prior to the transition to digital broadcasting. The VCT accomplishes this by using defined parameters to link a channel number to content received from a terrestrial broadcast, cable television transmission, satellite broadcast, etc. These defined parameters may include the major channel number, minor channel number, short name, service type, descriptor(s), etc.

In certain embodiments, the content provided by the content provider 10 includes one or more television programs, without regard to whether the content is a movie, sporting event, segment of a multi-part series, news broadcast, etc. Further, the content provided by the content provider 10 may also include advertisements, infomercials, and other program-like content which may not be reported as a program in an electronic program guide (EPG).

Figure 2:
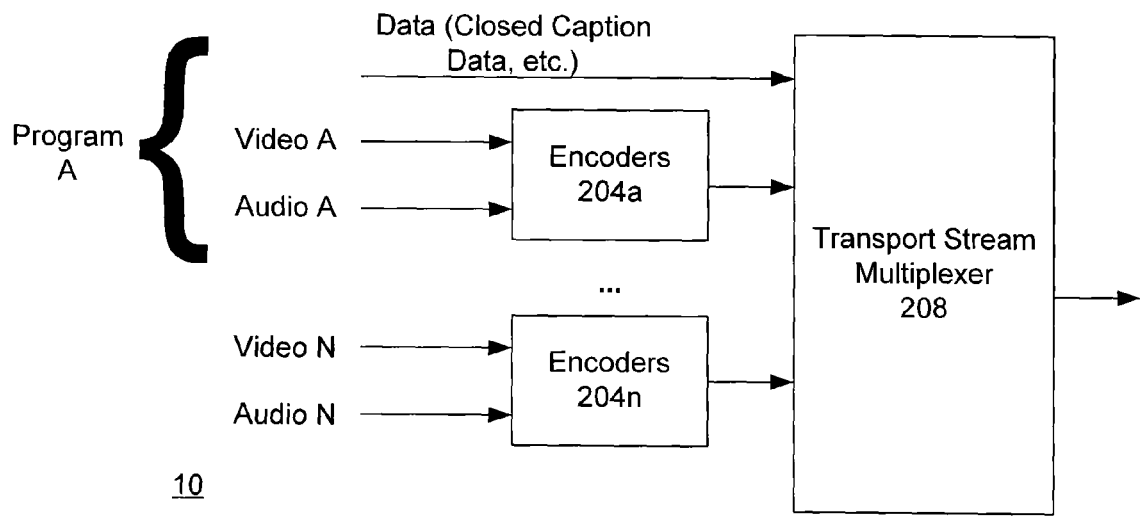
FIG. 2 is a block diagram of an exemplary transmission side system that assembles digital television content.

FIG. 2 is a basic diagram of an exemplary content provider 10. Generally speaking, a single content provider 10 may provide multiple programs over one or more transport streams. The audio, video, caption data, etc. are provided to an encoder which encodes the data into packets suitable for distribution. The audio and video program material is encoded by audio and video encoders 204 which are then provided to a transport stream multiplexer 208 which then provides an output that can be distributed via a physical channel medium such as a terrestrial or cable broadcast. In one embodiment, the transport stream multiplexer 208 adds each program stream and VCT data to a transport stream for distribution via the physical channel medium.

Figure 3:
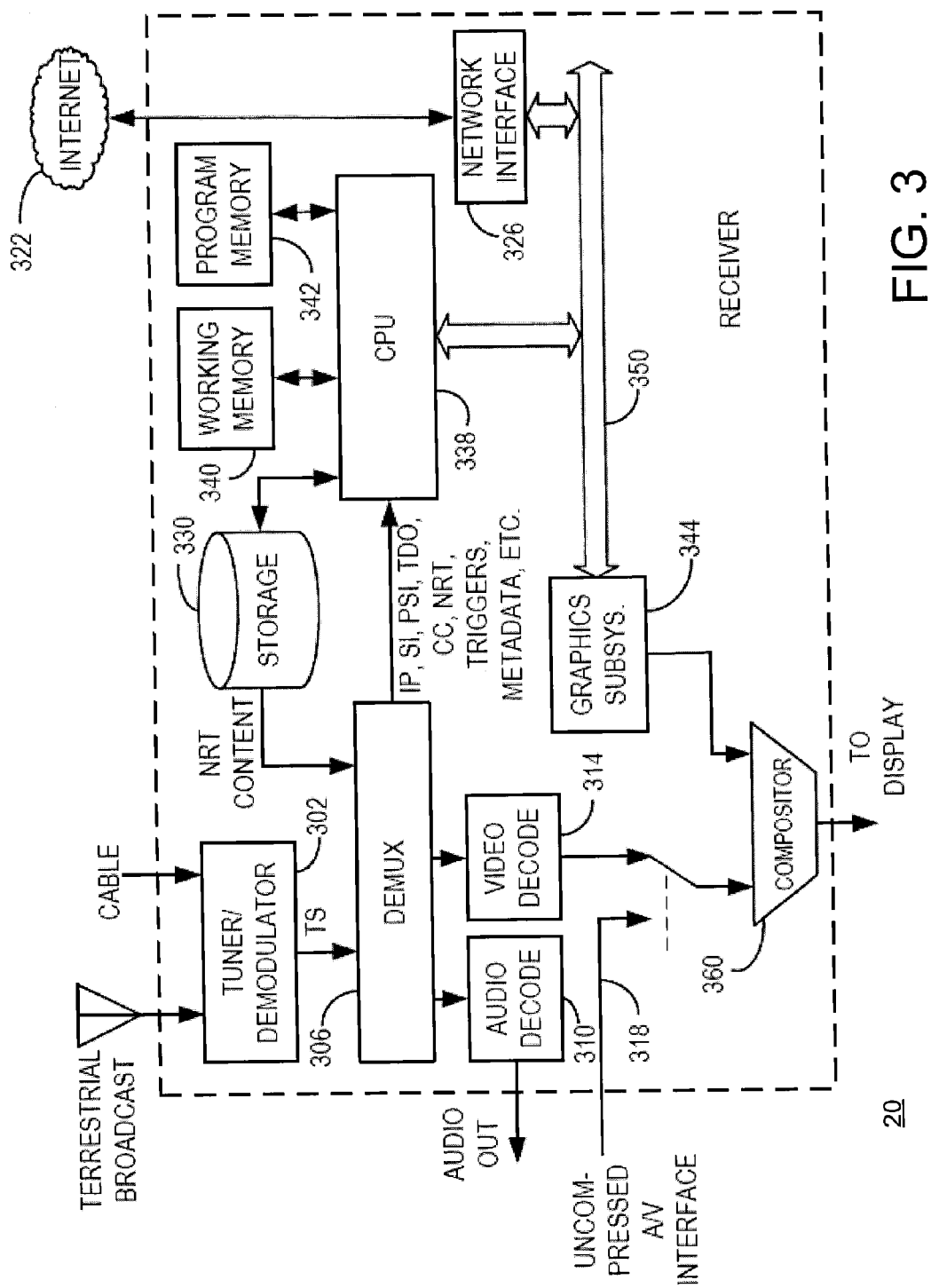
FIG. 3 is a block diagram of an exemplary reception apparatus.

A receiver is depicted as reception apparatus 20 in FIG. 3 wherein content is received via any suitable source such as terrestrial broadcast, cable or satellite at a reception apparatus 20's tuner/demodulator 302. The transport stream including triggered declarative objects (TDOs), triggers, VCT data, etc. from the tuner/demodulator 302 is demultiplexed at demultiplexer 306 into audio and video streams. The audio is decoded at an audio decoder 310 while the video is decoded at a video decoder 314. Uncompressed A/V data may also be received via an uncompressed A/V interface 318 that can be selectively utilized.

A/V content including the VCT data, TDOs, data, and triggers may also be received via the Internet 322 via a network interface and/or modem 326. Network interface 326 also provides for a back channel for communication with a broadcaster or other content provider. Additionally, storage 330 can be provided for non-real time (NRT) or Internet-delivered content such as Internet Protocol Television (IPTV). The stored content can be played by demultiplexing at 306 in a manner similar to that of other sources of content. The reception apparatus 20 generally operates under control of a processor such as CPU 338 which is interconnected to working memory 340 and program memory 342 as well as a graphics subsystem 344 via one or more buses such as 350.

The CPU 338 receives closed caption data from the demultiplexer 306 as well as any other information such as TDO announcements and electronic programming guides used for rendering graphic content and passes the information to the graphics subsystem 344 and the images are composited at the compositor and video interface 360 to produce an output suitable for display on a video display.

The CPU 338 operates to carry out various processes within the context of the subject matter disclosed herein including generation of elements used in rendering of a user interface. CPU 338 further operates to execute any scripts contained in the TDO and/or its trigger(s). In one example, the script can cause display of a program guide or schedule for a particular TV program.

CPU 338 also operates to oversee control of the digital television receiver including the tuner/demodulator 302 and other television resources. For example, the CPU 338 extracts the VCT data from the transport stream to determine if content contained in the transport stream can be presented by the reception apparatus 20.

Figure 4:
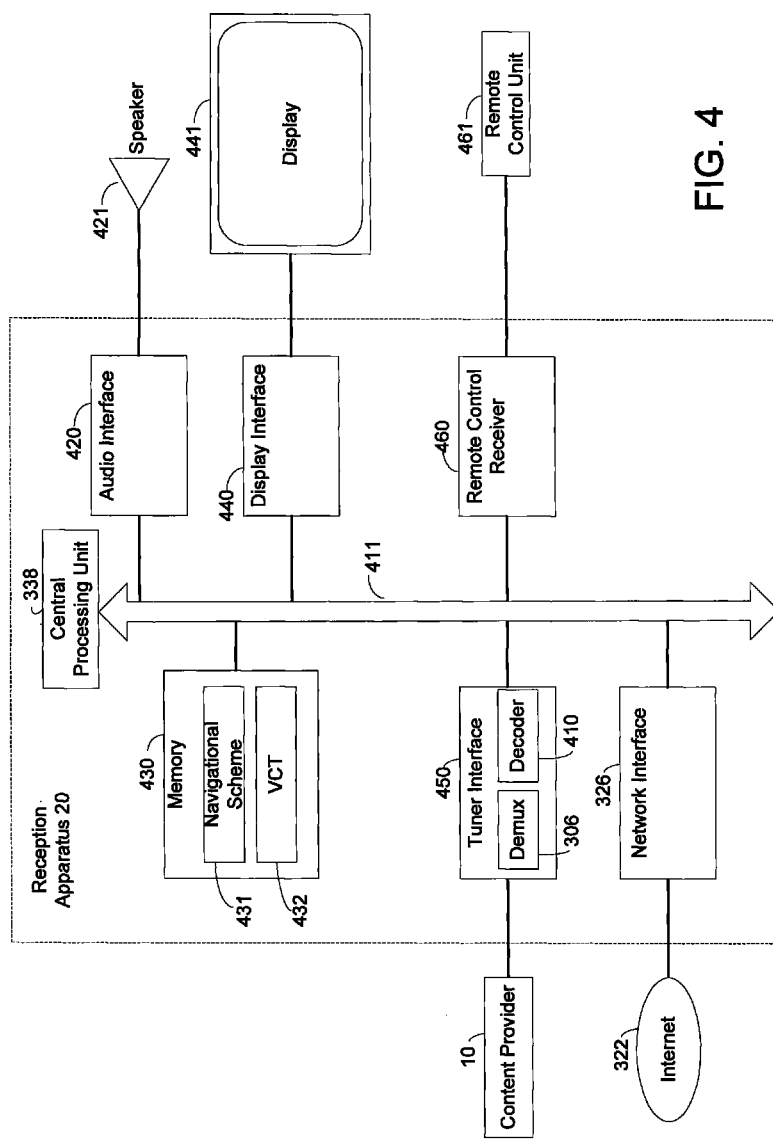
FIG. 4 is a processor-centric block diagram of an exemplary reception apparatus.

FIG. 4 is a block diagram of an exemplary reception apparatus 20 which can take on many forms including a television set, set-top box, etc. According to one embodiment, the reception apparatus 20 includes a central processing unit (CPU) 338, a memory 430, an audio interface 420, a display interface 440, a remote control receiver 460, a tuner interface 450, and a network interface 326

Data is communicated via one or more buses 411. Audio and/or video streams that have been decoded by the tuner interface 450 are retrieved. The decoded audio stream is sent to the audio interface 420 and the decoded video stream is sent to the display interface 440. The CPU 338 also receives data from and sends data to the Internet 322 via the network interface 326. Further, the CPU 338 executes commands received by the remote control receiver 460. These commands can be in the form of a direct channel entry through the keypad of the remote control unit 461 or inputs from the remote control unit 461 using an on-screen channel guide.

The memory 430 stores the data used by the reception apparatus 20. The memory 430 within the reception apparatus 20 can be implemented using disc storage form as well as other forms of storage such as non-transitory storage devices including for example network memory devices, magnetic storage elements, magneto-optical storage elements, flash memory, core memory and/or other non-volatile storage technologies. Additionally, the memory 430 can provide for non-real time (NRT) or Internet-delivered content such as Internet Protocol Television (IPTV). It should be noted that the use of the term "non-transitory" is a limitation of the medium itself (i.e., tangible, not a signal) as opposed to a limitation on data storage persistency (e.g., RAM vs. ROM).

The memory stores a navigational scheme 431 which provides, for example, the on-screen channel guide or an electronic programming guide (EPG), that allows the user to select desired content accessible via one or more communication interfaces to content sources such as a television broadcast and the Internet. A VCT provides a channel map for the CPU 338 to determine what content received by the tuner interface 450 corresponds to a user selected virtual channel entered via the remote control unit 461 or the navigational scheme 431.

The tuner interface 450 receives content provided through any suitable delivery source such as a terrestrial broadcast, cable transmission, satellite broadcast, or the Internet. The content is provided by one or more content providers. In one embodiment, the content is contained in a transport stream that includes one or more of channel data, VCT data, etc. The transport stream is received at the tuner interface 450 and is demultiplexed at demultiplexer 306 into audio, video, and/or data streams. The audio and/or video streams are decoded at decoder 410 within the tuner interface 450. Data streams from the content provider 10 contain information such as VCT data corresponding to the channels provided by the content provider 10. This data provided by the content provider 10 is placed in the VCT 432 within the reception apparatus memory 430 via the CPU 338.

The reception apparatus 20 generally operates under control of a processor such as CPU 338 which may be interconnected to any one or a combination of a memory 430, an audio interface 420, display interface 440, and remote control receiver 460 via one or more buses 411. When the transport stream is demultiplexed at the demultiplexer 306, audio and video data are sent to the decoder 410 for decoding and sent to the audio interface 420 and display interface 440, respectively. In addition to the audio and video data, the demultiplexer also receives VCT data updated by the content provider 10 to the VCT 432 in the memory 430. In one embodiment, the data in the VCT 432 is then used to update the navigational scheme 431 available to the user with the respective content available from the transport stream provided by the content provider 10. In addition to the content available from the content provider 10, the user can also access the Internet 322 through a network interface 326 with Internet content being generated and displayed via a browser or another appropriate application or player located in the memory 430.

The VCT 432 stored in the reception apparatus 20 is initially created using VCT data acquired via, for example, a channel scanning function of the reception apparatus 20. After the VCT data is initially acquired, in one embodiment, the VCT data is temporarily stored in the memory 430 for further processing. In one embodiment, the reception apparatus 20 processes the information for each channel in the received VCT data to determine if it has the necessary hardware and/or software resources to be able to offer a meaningful presentation of the channel. Based on the determination result for each channel, the reception apparatus 20 creates and stores the VCT 432 with an indicator of whether each of the channels as supported or unsupported. In another embodiment, the VCT 432 may be configured to only identify supported channels. In a further embodiment, the VCT data is used to create the VCT 432 without preprocessing being performed by the reception apparatus 20. Instead, the VCT data for a particular channel is processed when it is selected by a user of the reception apparatus 20.

When the user enters a channel number using the remote control unit 461 or selects a channel number via the navigational scheme 431, as presented on the display 441, the CPU 338 will receive the desired virtual channel number and access the VCT 432 in order to determine if there is a corresponding entry. If a match is found, then the CPU 338 will first process the information about the channel found in the VCT 432. If the information indicates that the reception apparatus 20 has the necessary hardware and/or software resources to be able to offer a meaningful presentation of the channel, it will instruct the tuner interface 450 to tune to the selected physical transmission channel and present the content associated with the channel via the display interface 440 and audio interface 420, which are connected to the display 441 and a speaker 421, respectively. If the necessary hardware and/or software resources are determined not to be available, the reception apparatus 20 does not present the content associated with the channel. In one embodiment, the CPU 338 determines whether the reception apparatus 20 is able to offer a meaningful presentation of the channel based on an indicator (e.g., supported or not supported) in, or associated with, the VCT 432. Alternatively, the VCT 432 instructs the tuner interface 450 to tune to the selected physical transmission channel based on the inclusion of the channel in the VCT 432, when the VCT 432 is configured to only store supported channels.

FIG. 5A illustrates an exemplary VCT. Initially, the VCT is populated with virtual channels corresponding to one or more content providers. The VCT is populated in response to, for example, a channel scanning function. As illustrated in FIG. 5A, each virtual channel includes a Service Type. The service_type field is a 6-bit field that carries the Service Type identifier, which identifies the type of service carried in the respective virtual channel. For example, as noted above, Service Type 0x02 identifies a regular DTV service. The reception apparatus 20 refers to the Service Type information contained in the VCT to determine whether it can present the programming content provided by each virtual channel.

In one embodiment, the reception apparatus 20 analyzes each virtual channel before determining whether the virtual channel should be added to the VCT stored in the reception apparatus 20. In another embodiment, the reception apparatus 20 adds all the virtual channels to the reception apparatus 20 and subsequently removes, or marks as "not presentable," any virtual channels that are not supported. For example, the reception apparatus 20 performs the removal process after all available virtual channels have been identified, for example by a channel scanning function, or performs the removal process at the time the virtual channel is first tuned. In another embodiment, a virtual channel with an unsupported service type is stored in the reception apparatus 20 but an indicator is added to identify the virtual channel as not presentable.

Further, in the event that the reception apparatus 20 receives one or a combination of a hardware update, software update, codec update, and an Internet connection, in some embodiments, the reception apparatus 20 performs a new channel scanning function or another function to determine whether any of the previously unsupported virtual channels are now supported by the reception apparatus 20. For example, if a virtual channel requires an Internet connection, the reception apparatus 20 optionally updates the status of the channel to receivable when an Internet connection is subsequently detected.

FIG. 5B illustrates exemplary field values of a virtual channel entry of a VCT. As illustrated in FIG. 5B, the TVCT includes a service_type field value of 0x09 designating the Service Type as EPS. However, other unassigned service_type field values may be used to designate the EPS, as specified in a standard developed by a standards body. Further, the virtual channel of the Service Type EPS includes descriptors such as one or more optional component_list_descriptor( )s and one or more parameterized_service_descriptor( )s.

As noted above, in some embodiments, a virtual channel with a value 0x09 in the service_type field indicates a service of type EPS. The VCT signaling in an EPS conveys information the receptions apparatus 20 can use to determine whether or not it has the hardware and/or software resources needed to create a meaningful presentation of the service. For virtual channels of service_type 0x09, this information can be conveyed in the component_list_descriptor( ) further discussed below, and/or in one or more Parameterized Service Descriptors (PSD) whose payload is predefined in, for example, other ATSC standards. The syntax and semantics of the PSD is described below with respect to FIG. 8.

As described above, the component_list_descriptor( ) is included in the VCT and conveys information the reception apparatus 20 can use to determine whether or not it has the hardware and/or software resources needed to create a meaningful presentation of a service. An exemplary bit stream syntax for the component_list_descriptor( ) is defined in the ATSC A/71 standard and is illustrated in FIG. 6. Each instance of the component_list_descriptor( ) identifies a set of components (which can include more than one instance of a particular stream_type) that, if supported in the reception apparatus 20, allows the reception apparatus 20 to properly render and present all programming on the corresponding Virtual Channel.

In one embodiment, as illustrated in FIG. 6, the component_list_descriptor( ) includes a descriptor_tag (e.g., 0xBB) that identifies the descriptor as a component_list_descriptor( ) a descriptor_length that specifies the number of bytes immediately following this field to the end of the descriptor; an alternate flag to indicate whether the instance of the component_list_descriptor( ) is a primary or alternate description of streams associated with a virtual channel; a component_count specifying the number of components specified in the following "for" loop (e.g., in the range of 1 to 126); a stream_type indicating the stream_type associated with a component of a particular iteration of the "for" loop; a format_identifier corresponding to the format_identifier in the MPEG-2 Registration Descriptor defined in ISO/IEC 13818-1 Sec. 2.6.9, which is incorporated herein by reference in its entirety, and identifies the entity providing the particular stream_type value; length_of_details specifying the byte length of the stream_info_details( ) (e.g., in the range of 1 to 250); and stream_info_details( ) providing further information about the component identified by the value in the preceding stream_type field. FIG. 7 illustrates an exemplary stream_information_details syntax for a stream_type as described in the ATSC A/71 standard.

In one embodiment, one, or at most two instances of the component_list_descriptor( ) may be present in the descriptor loop following the descriptors_length field of a terrestrial_virtual_channel_table_section( ) or cable_virtual_channel_table_section( ) in which the value of the service_type field is 0x09. However, the component_list_descriptor( ) need not be included in the descriptor loop. Further, in other embodiments, more than two component_list_descriptors( ) may be included in the descriptor loop.

If present, the component_list_descriptor( ) contains stream_info_details( ) for each essential stream_type other than the following:

0x02 (MPEG-2 video) when constrained by ATSC A/53; or
0x81 (AC-3 audio) when constrained by ATSC A/53.

It should be noted that, in one embodiment, the stream types included are not limited to those appearing in the Program Map Table (PMT) sections within the MPEG-2 Transport Stream; they may be transported and identified in other protocol layers, for example in a Service Map Table carried in an IP subnet tunneled via an elementary stream component of the program.

In one embodiment, one or more PSDs must be present in the descriptor loop following the descriptors_length field for virtual channels of service_type value 0x09. Each PSD signals further information about the service pertinent to the reception apparatus 20 when deciding whether or not it can offer a meaningful presentation of the service to the user.

Future protocols may extend the length of the PSD and/or stream_info_details( ) data structures by adding new fields at the ends. The newly-defined fields may indicate modes of operation that are not supported by the reception apparatus 20. Therefore, in one embodiment, the reception apparatus 20 is configured to conclude that it does not have the necessary resources to decode the channel, when encountering these unexpected extensions.

FIG. 8 is an exemplary bit stream syntax for the PSD. As described above, in one embodiment, the parameterized_service_descriptor( ) is delivered in a virtual channel of service_type value 0x09 to convey specific information the reception apparatus 20 can use to determine whether or not it can create a meaningful presentation of the services on the channel. The PSD, as defined, carries a payload whose syntax and semantics are application-specific. A field called application_tag identifies the application to which the payload applies.

Exemplary descriptions of the fields included in the PSD bit stream syntax are as follows:

descriptor_tag—This 8-bit unsigned integer identifies this descriptor as a parameterized_service_descriptor( ).

descriptor_length—This 8-bit unsigned integer specifies the length (in bytes) immediately following this field up to the end of this descriptor. In one embodiment, the maximum value is 255. However, other embodiments may implement other maximum values.

application_tag—This 8-bit unsigned integer identifies the application associated with the application_data( ) to follow. In one embodiment, values of application_tag are specified in other ATSC standards and are managed by the ATSC Code Points Registrar.

application_data( )—The syntax and semantics of this field are specified, for example, in a ATSC standard that establishes the associated application_tag value.

Figure 9A:
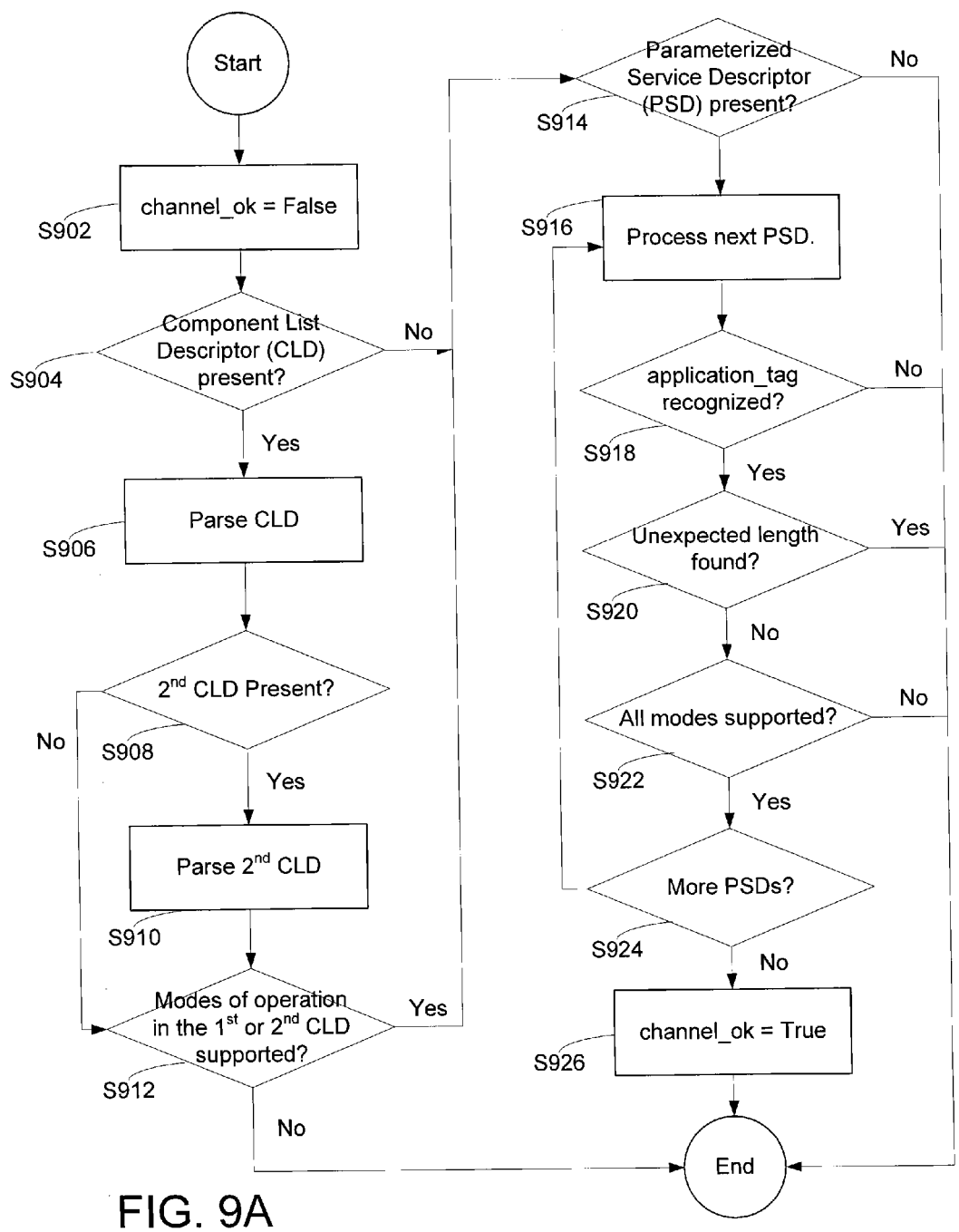
FIGS. 9A and 9B illustrate exemplary algorithms used by a reception apparatus.
Figure 9B:
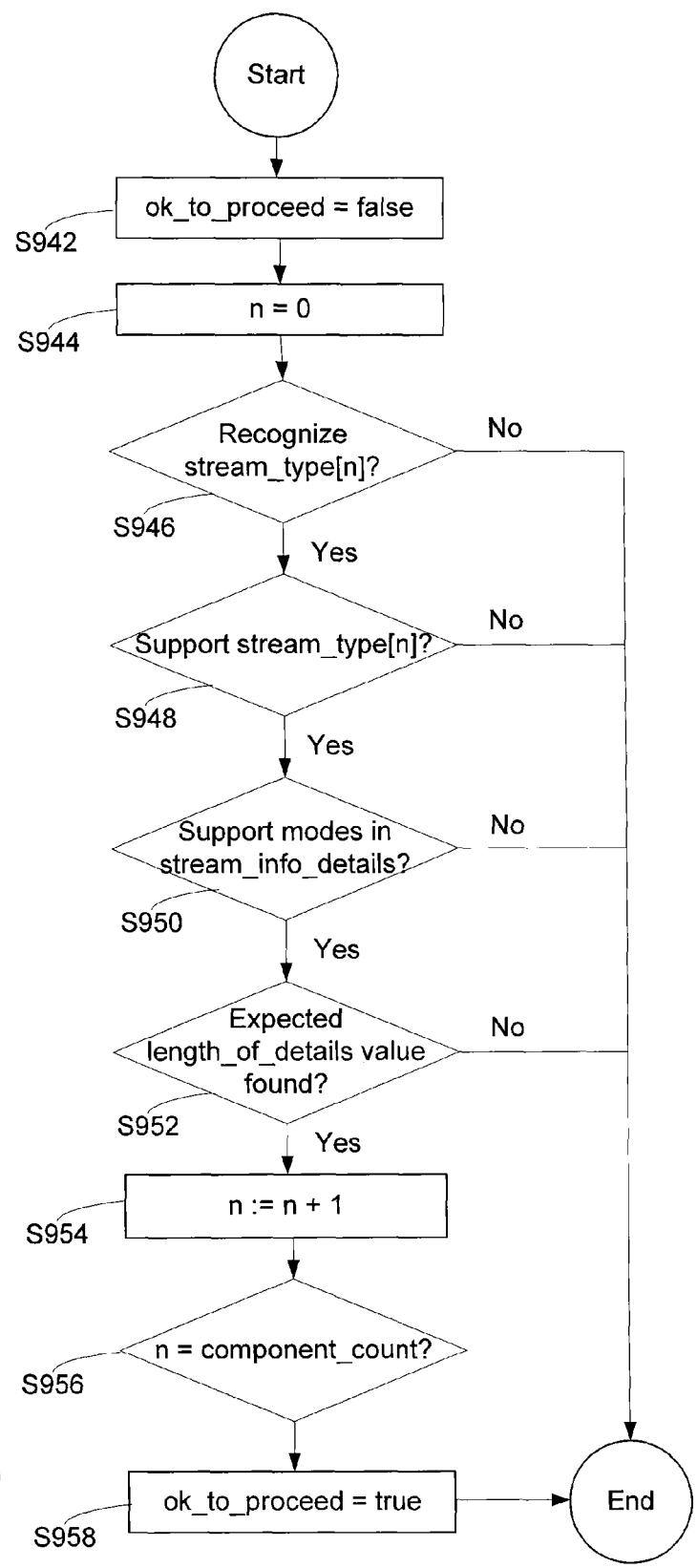

FIGS. 9A and 9B illustrate exemplary algorithms used by the reception apparatus 20 to process the PSD(s) and component_list_descriptor( )(s) in a virtual channel of service_type value 0x09.

FIG. 9A is an exemplary algorithm used by the reception apparatus 20 when processing a Virtual Channel Table entry indicating a service_type value of 0x09, corresponding to the EPS. The algorithm uses the "Parse Component List Descriptor" routine illustrated in FIG. 9B. The process involves first checking the Component List Descriptor to see if the stream types are supported, and for each supported stream type, if the stream_info_details( ) indicates a supported mode of operation. If no unsupported modes are found in the Component List Descriptor, the Parameterized Service Descriptors are checked. In one embodiment, the case that no PSD is found represents an error in the received signal; the expected response by the reception apparatus 20 in this case is to decide the channel is unavailable.

Next, each PSD is checked in turn to see if the application_tag value is recognized, and if it is, whether or not the modes of operation of the channel described in the descriptor are supported. If the descriptor_length field indicates a value larger or smaller than expected, in one embodiment, the reception apparatus 20 concludes that the channel cannot be reliably decoded (the assumption being that the unrecognized parameters provided may indicate an unsupported mode of operation).

As illustrated in FIG. 9A, at step S902, the reception apparatus 20 sets a channel_ok status for a Virtual Channel to an initial "tentative result" value (e.g., false). However, in other embodiments, the setting of the initial value may be skipped and the value of the result set just prior to exiting the routine. In step S904, the reception apparatus 20 determines whether a component_list_descriptor( ) (CLD) corresponding to the virtual channel is present. An exemplary CLD is illustrated in FIG. 13A. When a CLD is not present, the reception apparatus 20 proceeds to step S914 to determine whether a PSD is present, as described below. When the CLD is determined to be present in step S904, the reception apparatus 20 proceeds to step S906 and parses the CLD, for example as described below with respect to FIG. 9B. In step S908, the reception apparatus 20 determines whether a second CLD is present. When a second CLD is not present, the reception apparatus 20 proceeds to step S912. However, if a second CLD is determined to be present in step S908, the second CLD is parsed in step S910 in a similar manner as the first CLD. The logic depicted allows the process to continue if either of the two CLDs indicates "ok to proceed."

In another embodiment, after parsing the CLD in step S906, the reception apparatus 20 determines whether mode(s) of operation included in the first CLD are supported by the reception apparatus 20. When the first CLD is determined to be supported, the reception apparatus 20 proceeds directly to step S914 without regard to whether a second CLD is present.

In step S912, the reception apparatus 20 determines whether mode(s) of operation included in either the first CLD or the second CLD (when present) are supported by the reception apparatus 20. When no CLD is determined to be supported, the process ends and, in one embodiment, the reception apparatus 20 proceeds to analyze any remaining virtual channels. When at least one CLD is determined to be supported in step S912, the reception apparatus 20 proceeds to step S914, at which time the reception apparatus 20 determines if any PSDs are present. In one embodiment the process ends if no PSDs are present. If a PSD is determined to be present, the reception apparatus 20 proceeds to step S916 to process the PSD. In step S918, the reception apparatus 20 determines if the application_tag included in the PSD is recognized. If the application_tag is determined to be recognized, the reception apparatus 20 proceeds to step S920 and determines if the length of the PSD is expected. If the length is determined to be expected, the reception apparatus 20 proceeds to step S922 to determine if each mode listed in the PSD is supported. In one embodiment the process ends if the application_tag is not recognized in step S918, an unexpected length is found in step S920, or any mode is determined not to be supported in step S922.

In step S924, the reception apparatus 20 determines if there are any additional PSDs. The reception apparatus 20 repeats steps S916, S918, S920, S922, and S924 if additional PSDs are present. If the reception apparatus 20 continues the process until step S926 is reached, the Virtual Channel is set as supported by the reception apparatus 20.

FIG. 9B illustrates an exemplary Parse Component List Descriptor routine. The component list descriptor is checked to see if the stream types are supported, and for each supported stream type, if the stream_info_details( ) indicates a supported mode of operation. In one embodiment, two instances of the CLD may be present in the Virtual Channel Table entry. If the reception apparatus 20 determines that it can handle the stream_type values described in either one, along with any PSDs, it will be able to reliably present the channel.

"Parse Component List Descriptor" routine returns a Boolean variable called ok_to_proceed, as illustrated in FIG. 9B. In step S942, the reception apparatus 20 optionally sets a channel_ok status for a Virtual Channel to an initial value (e.g., false). In step S944, a count n is set to 0 to begin analysis of the first component included in the CLD.

As shown, for each stream type value listed in the descriptor, the following checks are made: step S946, is the stream type value recognized; step S948, is the stream type supported in the reception apparatus hardware and/or software; step S950, for this stream type, are the modes of operation described in stream_info_details( ) supported; step S952, is the value of length_of_details as expected. In one embodiment if the answer to any of these questions is "no," the routine returns a value of "false" in the variable called "ok_to_proceed," otherwise a value of "true" is returned.

In other embodiments, the reception apparatus 20 need not support all modes of operation defined in each PSD to present the Virtual Channel. Further, for example, as illustrated in FIG. 9A, the processing of PSD is described in a specific order (e.g., S918, S920, and S922). However, embodiments of the disclosure are not so limited and the steps performed by the reception apparatus 20 may be performed concurrently or in different orders.

A 3D service is an example of an application identified by a PSD. In one embodiment, the 3D service is assigned to an application_tag value of 1. For a service compatible hybrid-coded (SCHC) 3D service, the left view and right view are transported in different elementary streams. One view is offered as a 2D TV service and the audio may or may not be common between the 2D and 3D views. For an independent-coded 3D (IC3D) service, the left view and right view are transported in different elementary streams or are transported in one elementary stream. Neither view is offered as a 2D service. However, it should be noted that in certain embodiments whether or not a 2D version of the 3D content is offered on another channel is irrelevant with respect to a given Virtual Channel because the decoder just needs to know whether it can handle the decoding of content.

FIG. 10A illustrates an exemplary stream_info_details syntax for a Service Compatible Hybrid Coding (SCHC) 3D service in which an additional view is encoded using AVC. In one embodiment, a Virtual Channel that carries a stereoscopic 3DTV service is identified by service_type 0x09 in the VCT. In addition, the VCT includes the following descriptors in the descriptor loop following the descriptors_length field of the terrestrial_virtual_channel_table_section( ) or cable_virtual_channel_table_section( ): (1) a CLD; and (2) a PSD.

The component_list_descriptor( ) provides information about the codecs used to encode the SCHC service. The parameterized_service_descriptor( ) provides information about the type of 3D service carried, which can facilitate the behaviors of the 3DTV receivers (e.g., reception apparatus 20) to display the stereoscopic video. In one embodiment, the component_list_descriptor( ) is present in the descriptor loop of the TVCT (or CVCT when present) to describe video components of an SCHC service. For an SCHC program, the component_list_descriptor( ) includes a stream_info_details( ) entry for the video stream comprising the base view, for example, in the case that it is not MPEG-2 video constrained by A/53 Part 4, and a stream_info_details( ) entry for the video stream comprising the additional view.

In one embodiment, for an SCHC service in which the additional view is encoded using AVC, the component_list_descriptor( ) includes stream_info_details for stream_type 0x23. As illustrated in FIG. 10A, the stream_info_details for the stream_type 0x23 includes the following fields:

additional_view_AVC_profile—This 2-bit unsigned integer field indicates the AVC profile used for the alternate view. In one embodiment, the semantics of this 2-bit field is the same as the AVC_profile field in the stream_info_details( ) for AVC video specified in Section 6.3 of A/72 Part 2. The value in this field is the highest (most complex) value that applies to the period covered by the event information tables (EITs) that contain signaling for this virtual channel.

additional_view_level_idc—This 6-bit unsigned integer field indicates the AVC level used for the alternate view. In one embodiment, the semantics of this 6-bit field is the same as the field level_idc in the stream_info_details( ) for AVC video specified in Section 6.3 of A/72 Part 2. The value in this field is the highest (most complex) value that applies to the period covered by the EITs that contain signaling for this virtual channel.

horizontal_upsampling_factor and vertical_upsampling_factor—These fields provide higher-level information on any up-sampling that may facilitate optimization of the display of the decoded video component. When not set to '0001', the values and description of up-sampling factors match those that apply to the period covered by the EITs that contain signaling for this virtual channel, and are from a list of pre-defined values as defined in, for example, ISO/IEC 13818-1: 2007/Amd.7—Signaling of stereoscopic video in MPEG-2 systems including the user private range, which is incorporated herein by reference in its entirety. The coding is provided in FIG. 10B, which illustrates exemplary horizontal and vertical up-sampling factors, for convenience.

FIG. 11A illustrates exemplary application_data( ) included in a PSD for an SCHC service. As illustrated in FIG. 11A, the value of application_tag for the SCHC service is 0x01. The application_data( ) for application_tag value 0x01 includes 3D_channel_type, which indicates the type of 3D service carried in the Virtual Channel associated with the PSD. In one embodiment, the 3D_channel_type is an unsigned integer field of, for example, 5 bits. Exemplary coding for the 3D_channel_type is illustrated in FIGS. 11B and 11C.

Figure 12:
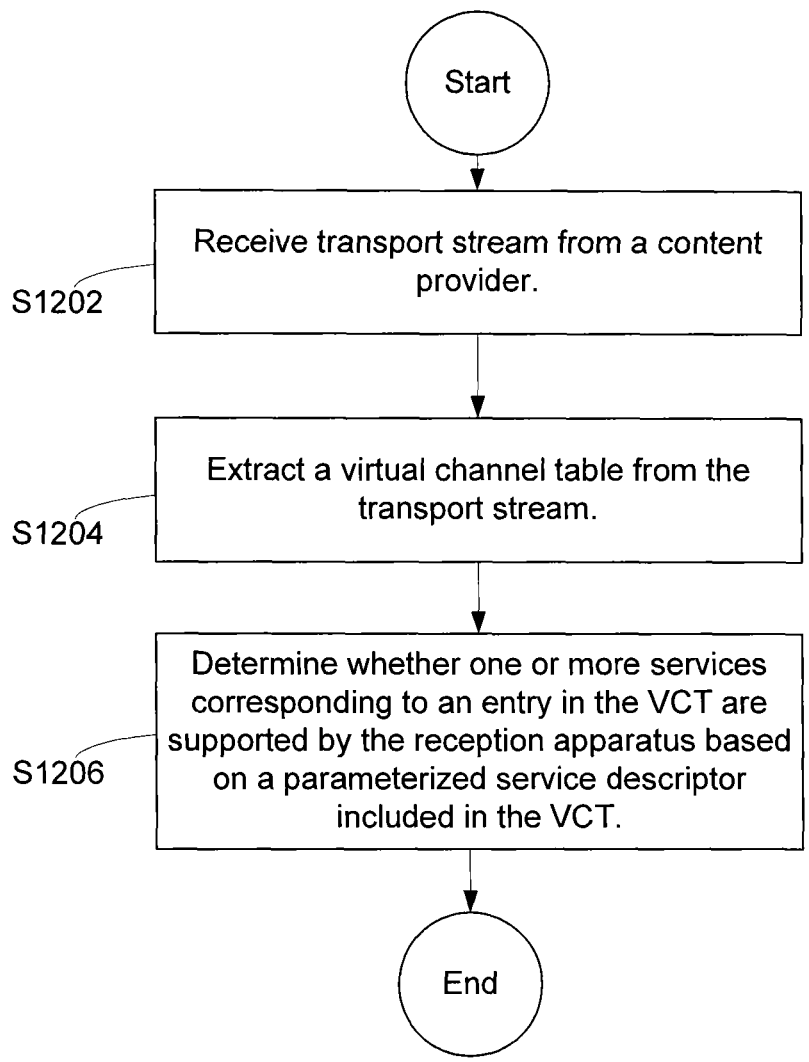
FIG. 12 illustrates an exemplary method performed by an exemplary reception apparatus.

FIG. 12 illustrates an exemplary general method performed by the reception apparatus 20 to identify content that can be presented to a user. In step S1202, the reception apparatus 20 receives a transport stream from a content provider. In step S1204, the reception apparatus 20 extracts a VCT from the transport stream. In step S1206, the reception apparatus determines whether one or more services, corresponding to an entry included in the VCT, are supported by the reception apparatus based on a parameterized service descriptor (PSD). The PSD is associated with a predetermined Service Type and included in the VCT.

Embodiments of the present disclosure avoid unnecessary assignment of new descriptor_tag values (for example, every time a new application for a Virtual Channel arises), provide a flexible, extensible mechanism to signal new types of DTV services, and allow the retention of the standard rule whereby receivers are allowed to disregard unrecognized descriptors (ones for which the descriptor_tag is unrecognized).

In another embodiment, for example for stereoscopic 3D-TV, a stereoscopic channel descriptor can be used as an alternative or in conjunction with the PSD. In one embodiment, the required descriptors include a component list descriptor and a stereoscopic channel info descriptor. The component list descriptor identifies the one or more codecs used and profile/level information. The stereoscopic channel info descriptor identifies the 3D format (e.g., full-frame, frame-compatible), for frame compatible the frame packing arrangement, and references other standards for alternate transport paths for an additional view. FIG. 13A illustrates exemplary component list descriptor contents and FIG. 13B illustrates an exemplary stereoscopic channel info descriptor.

Figure 14:
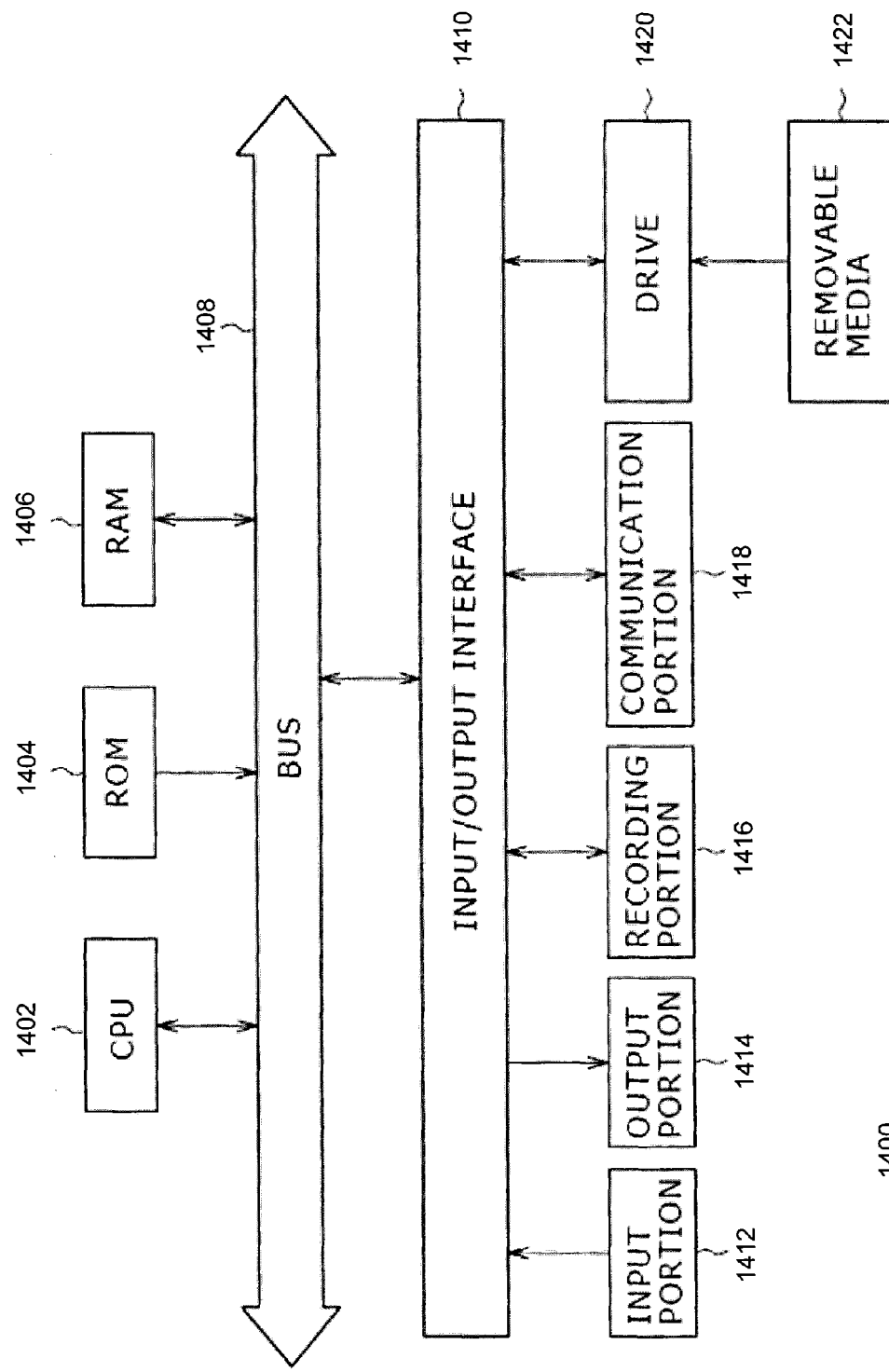
FIG. 14 illustrates an exemplary computer.

FIG. 14 is a block diagram showing an example of a hardware configuration of a computer 1400 configured to function as any one or a combination of the content provider 10 and reception apparatus 20.

As illustrated in FIG. 14, the computer 1400 includes a central processing unit (CPU) 1402, read only memory (ROM) 1404, and a random access memory (RAM) 1406 interconnected to each other via one or more buses 1408. The one or more buses 1408 is further connected with an input-output interface 1410. The input-output interface 1410 is connected with an input portion 1412 formed by a keyboard, a mouse, a microphone, remote controller, etc. The input-output interface 1410 is also connected to a output portion 1414 formed by an audio interface, video interface, display, speaker, etc.; a recording portion 1416 formed by a hard disk, a non-volatile memory, etc.; a communication portion 1418 formed by a network interface, modem, USB interface, fire wire interface, etc.; and a drive 1420 for driving removable media 1422 such as a magnetic disk, an optical disk, a magneto-optical disk, a semiconductor memory, etc.

According to one embodiment, the CPU 1402 loads a program stored in the recording portion 1416 into the RAM 1406 via the input-output interface 1410 and the bus 1408, and then executes a program configured to provide the functionality of the one or combination of the content provider 10 and reception apparatus 20.

The various processes discussed above need not be processed chronologically in the sequence depicted as flowcharts; the steps may also include those processed in parallel or individually (e.g., in paralleled or object-oriented fashion).

Also, the programs may be processed by a single computer or by a plurality of computers on a distributed basis. The programs may also be transferred to a remote computer or computers for execution.

Furthermore, in this specification, the term "system" means an aggregate of a plurality of component elements (apparatuses, modules (parts), etc.). All component elements may or may not be housed in a single enclosure. Therefore, a plurality of apparatuses each housed in a separate enclosure and connected via a network are considered a network, and a single apparatus formed by a plurality of modules housed in a single enclosure are also regarded as a system.

Also, it should be understood that this technology when embodied is not limited to the above-described embodiments and that various modifications, variations and alternatives may be made of this technology so far as they are within the spirit and scope thereof.

For example, this technology may be structured for cloud computing whereby a single function is shared and processed in collaboration among a plurality of apparatuses via a network.

Also, each of the steps explained in reference to the above-described flowcharts may be executed not only by a single apparatus but also by a plurality of apparatuses in a shared manner.

Furthermore, if one step includes a plurality of processes, these processes included in the step may be performed not only by a single apparatus but also by a plurality of apparatuses in a shared manner.

Numerous modifications and variations of the present disclosure are possible in light of the above teachings. It is therefore to be understood that within the scope of the appended claims, the embodiments may be practiced otherwise than as specifically described herein.

The invention claimed is:

1. A method of a reception apparatus for accessing content, comprising:
   receiving a transport stream from a content provider;
   extracting, by circuitry of the reception apparatus, a virtual channel table (VCT) from the transport stream; and
   when a virtual channel defined in the VCT is associated with a predetermined Service Type for an extended parameterized service that conveys a parameterized service descriptor (PSD),
      determining whether a component list descriptor (CLD) is included for the virtual channel in the VCT, and
      determining, by the circuitry, whether one or more services corresponding to the virtual channel is supported by the reception apparatus based on the PSD included in the VCT, wherein
      the PSD has a bit-stream syntax that is different from a bit-stream syntax of the component list descriptor (CLD).

2. The method according to claim 1, wherein
   the PSD includes a descriptor tag, a descriptor length, an application tag, and application data, the application tag identifying an application to which the application data applies.

3. The method according to claim 1, wherein
   the PSD is associated with Service Type 0x09.

4. The method according to claim 2, wherein the step of determining comprises:
   parsing at least one CLD including one or more stream types, the at least one CLD being included in the VCT; and
   determining whether the one or more stream types are supported by the reception apparatus.

5. The method according to claim 2, wherein the step of determining comprises:
   determining whether the application tag included in the PSD is recognized;
   determining whether the length of the PSD is within a predetermined range;
   determining whether each mode defined in the application data is supported by the reception apparatus; and
   determining whether the one of more services corresponding to the virtual channel is supported by the reception apparatus when the application tag is recognized, the length of the PSD is within the predetermined range, and each mode defined in the application data is supported.

6. A non-transitory computer-readable storage medium having embedded therein instructions, which when executed by a computer, causes the computer to perform a method for accessing content, the method comprising:
   receiving a transport stream from a content provider;
   extracting a virtual channel table (VCT) from the transport stream; and
   when a virtual channel defined in the VCT is associated with a predetermined Service Type for an extended parameterized service that conveys a parameterized service descriptor (PSD),
      determining whether a component list descriptor (CLD) is included for the virtual channel in the VCT, and
      determining whether one or more services corresponding to the virtual channel is supported by the reception apparatus based on the PSD included in the VCT, wherein
      the PSD has a bit-stream syntax that is different from a bit-stream syntax of the component list descriptor (CLD).

7. A reception apparatus, comprising:
circuitry configured to
  receive a transport stream from a content provider;
  extract a virtual channel table (VCT) from the transport stream; and
  when a virtual channel defined in the VCT is associated with a predetermined Service Type for an extended parameterized service that conveys a parameterized service descriptor (PSD),
  determine whether a component list descriptor (CLD) is included for the virtual channel in the VCT, and
  determine whether one or more services corresponding to the virtual channel is supported by the reception apparatus based on the PSD included in the VCT, wherein
  the PSD has a bit-stream syntax that is different from a bit-stream syntax of the component list descriptor (CLD).

8. The reception apparatus according to claim 7, wherein the PSD includes a descriptor tag, a descriptor length, an application tag, and application data, the application tag identifying an application to which the application data applies.

9. The reception apparatus according to claim 7, wherein the PSD is associated with Service Type 0x09.

10. The reception apparatus according to claim 8, wherein the circuitry is further configured to
  parse at least one CLD including one or more stream types, the at least one CLD being included in the VCT; and
  determine whether the one or more stream types are supported by the reception apparatus.

11. The reception apparatus according to claim 8, wherein the circuitry is further configured to
  determine whether the application tag included in the PSD is recognized;
  determine whether the length of the PSD is within a predetermined range;
  determine whether each mode defined in the application data is supported by the reception apparatus; and
  determine whether the one of more services corresponding to the virtual channel is supported by the reception apparatus when the application tag is recognized, the length of the PSD is within the predetermined range, and each mode defined in the application data is supported.

12. An information providing apparatus, comprising:
circuitry configured to
  store or receive content;
  encode the content;
  generate a transport stream including the encoded content and a virtual channel table (VCT), the VCT including a parameterized service descriptor (PSD) for a virtual channel associated with a predetermined Service Type of an extended parameterized service; and
  when a component list descriptor (CLD) is included for the virtual channel in the VCT, the PSD has a bit-stream syntax that is different from a bit-stream syntax of the component list descriptor (CLD).

* * * * *